United States Patent
Lee

(10) Patent No.: US 8,161,417 B1
(45) Date of Patent: Apr. 17, 2012

(54) ENHANCING USABILITY OF A MOVING TOUCH SCREEN

(75) Inventor: Woojae Lee, Manhattan, KS (US)

(73) Assignee: Sprint Communications Company L.P., Overland Park, KS (US)

(*) Notice: Subject to any disclaimer, the term of this patent is extended or adjusted under 35 U.S.C. 154(b) by 323 days.

(21) Appl. No.: 12/612,484

(22) Filed: Nov. 4, 2009

(51) Int. Cl.
*G06F 3/00* (2006.01)
*G06F 3/048* (2006.01)

(52) U.S. Cl. ............... 715/866; 715/802; 715/790

(58) Field of Classification Search ............. 715/866, 715/802, 790
See application file for complete search history.

(56) References Cited

U.S. PATENT DOCUMENTS

| | | | |
|---|---|---|---|
| 6,304,259 B1 * | 10/2001 | DeStefano | 715/805 |
| 6,400,376 B1 * | 6/2002 | Singh et al. | 345/685 |
| 6,523,048 B2 * | 2/2003 | DeStefano | 715/234 |
| 2006/0017692 A1 * | 1/2006 | Wehrenberg et al. | 345/156 |
| 2009/0288022 A1 * | 11/2009 | Almstrand et al. | 715/762 |
| 2010/0085317 A1 * | 4/2010 | Park et al. | 345/173 |
| 2011/0250871 A1 * | 10/2011 | Huang et al. | 455/412.2 |

* cited by examiner

*Primary Examiner* — William Bashore
*Assistant Examiner* — David Phantana Angkool

(57) ABSTRACT

A system and method for improving the usability of a touch screen on a moving mobile device are provided. Upon determining the mobile device is moving in a pattern that is consistent with a person walking while carrying the mobile device, a new interface that is easier to use is displayed. The new interface may be easier to use than a standard interface by showing less action buttons, zooming into a portion of the standard interface, and/or by requiring less user input to complete a requested task.

17 Claims, 7 Drawing Sheets

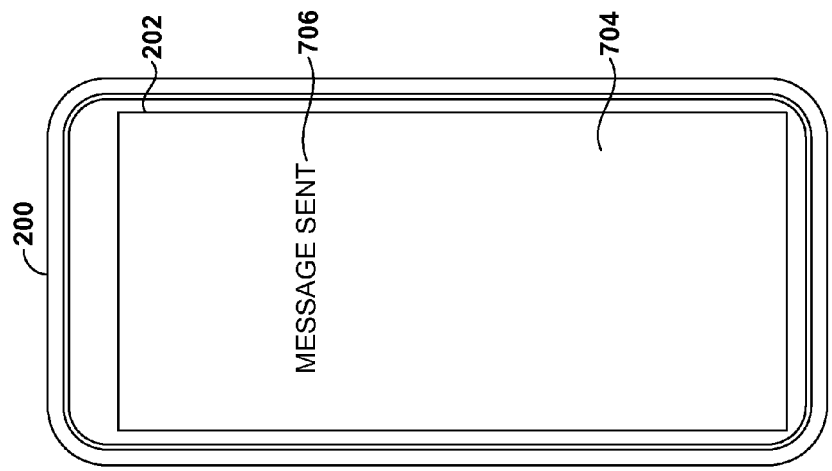
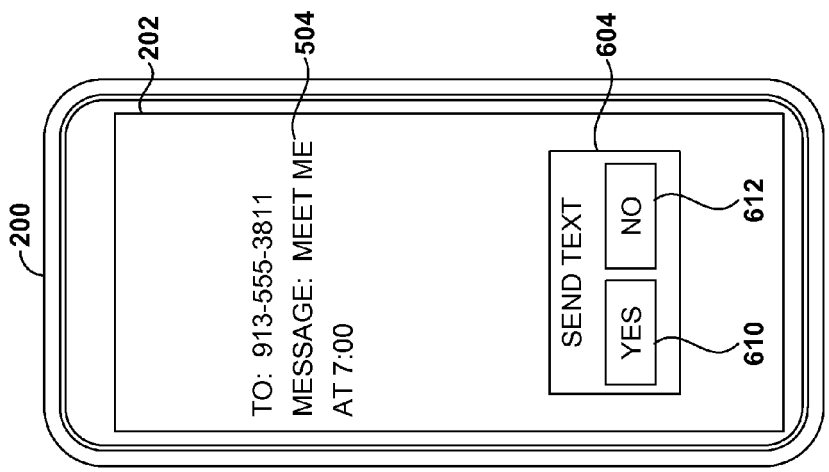

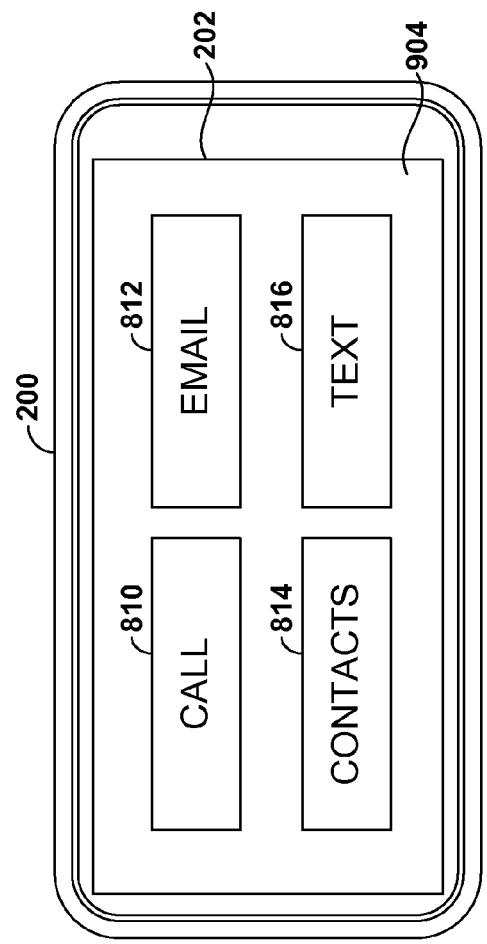
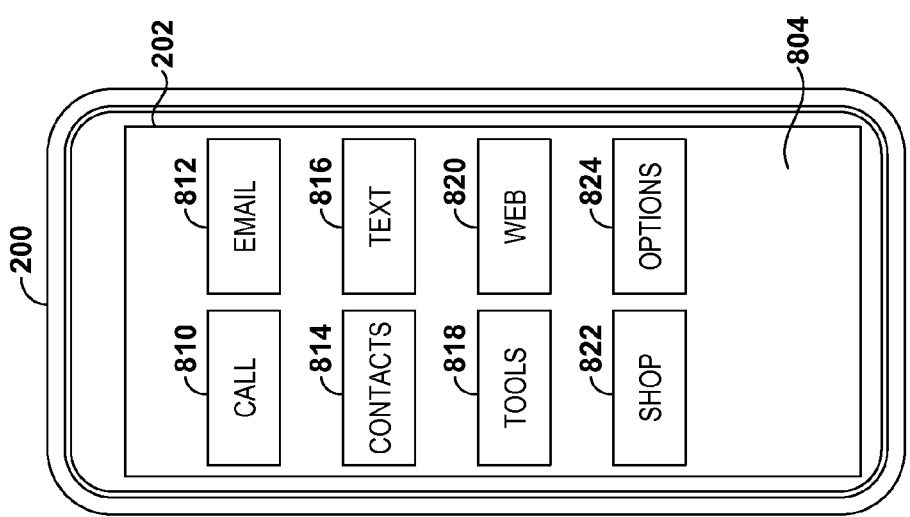
FIG. 9.
FIG. 8.

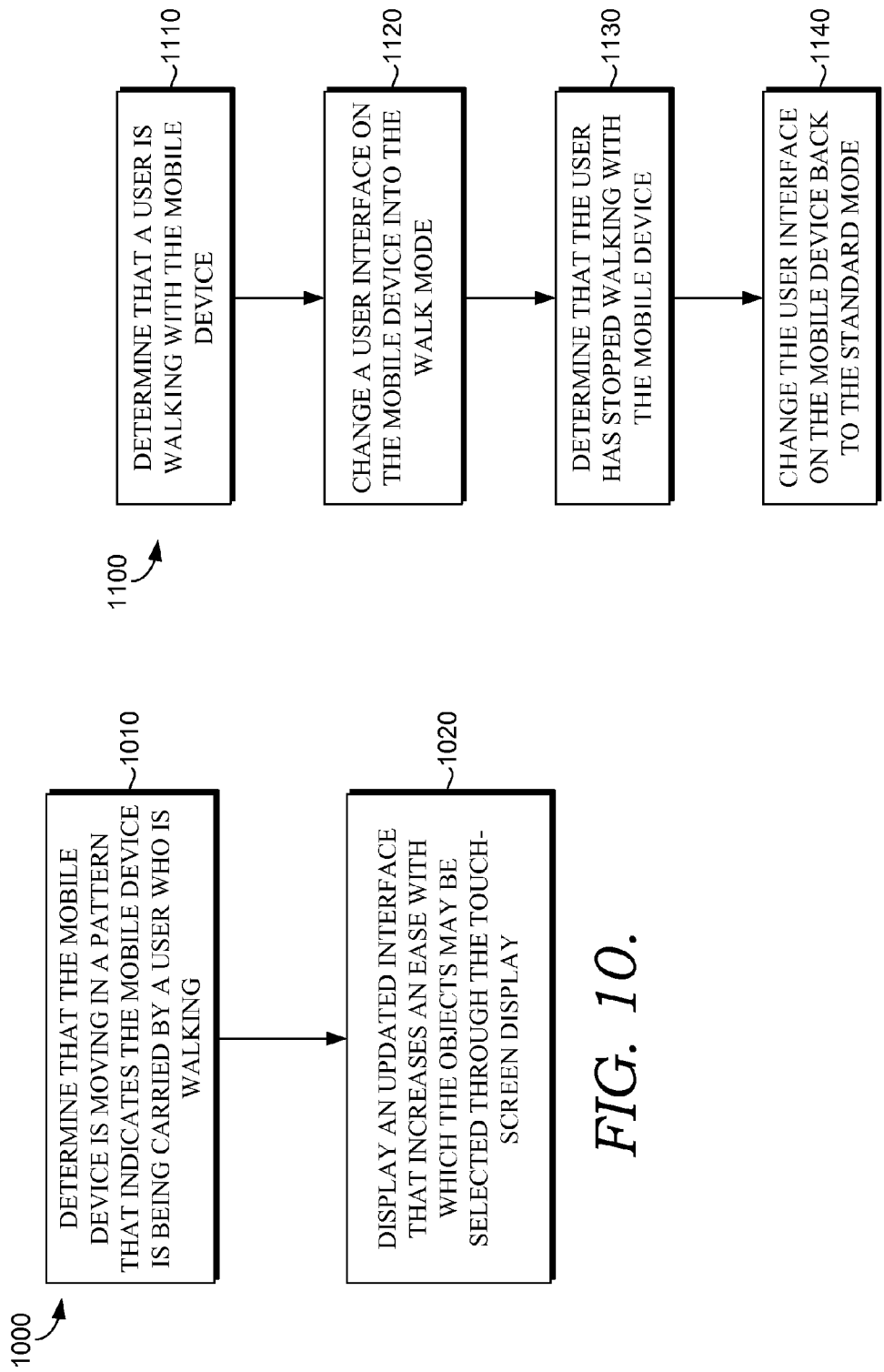

ENHANCING USABILITY OF A MOVING TOUCH SCREEN

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, one or more computer-readable media having one or more computer-executable instructions embodied thereon for performing a method of enhancing selectability of objects displayed on a mobile device's touch screen are provided. The method includes determining that the mobile device is moving in a pattern that indicates the mobile device is being carried by a user who is presently walking. The pattern is detected using readings from accelerometers in the mobile device. The method also includes displaying, though the mobile device's touch screen, a walk-mode interface that increases an ease with which the objects may be selected through the touch screen as compared to a standard interface displayed when the user of the mobile device is not walking with the mobile device.

In another illustrative embodiment, one or more computer-readable media having one or more computer-executable instructions embodied thereon for performing a method of improving usability of a mobile device when a user is walking with the mobile device. The method includes determining that a user is walking with the mobile device. The method also includes changing a user interface on the mobile device into a walk mode showing from a standard mode. The walk mode shows a first content and the standard mode shows a second content. The walk mode displays less content than the standard mode. The method also includes determining that the user has stopped walking with the mobile device and changing the user interface on the mobile device back to the standard mode.

In a third illustrative embodiment, a method of changing a display mode on a mobile device when a user of the mobile device is walking with the mobile device. The method includes determining that the mobile device is moving in a pattern that indicates the mobile device is being carried by a user who is presently walking. The pattern is detected using readings from accelerometers in the mobile device. The method also includes determining that a content associated with a contact is presently displayed on the mobile device. The method further includes selecting objects for inclusion in a walk-mode interface based on the contact, thereby customizing the walk-mode interface based on the contact. The method also includes changing a user interface on the mobile device into the walk mode showing the first content from a standard mode showing a second content, wherein the walk mode displays less content than the standard mode.

BRIEF DESCRIPTION OF THE SEVERAL VIEWS OF THE DRAWINGS

Illustrative embodiments of the present invention are described in detail below with reference to the included drawing figures, wherein:

FIG. 6 is a diagram showing a confirmation interface, in accordance with an embodiment of the present invention;

FIG. 7 is a diagram showing a message sent interface, in accordance with an embodiment of the present invention;

FIG. 8 is a diagram showing a user interface in standard mode, in accordance with an embodiment of the present invention;

FIG. 9 is a diagram showing the user interface in a walk mode that is generated by zooming into a portion of the standard interface, in accordance with an embodiment of the present invention;

FIG. 10 is a flow chart showing a method of enhancing selectability of objects displayed on a mobile device's touch screen, in accordance with an embodiment of the present invention;

FIG. 11 is a flow chart showing a method of improving usability of a mobile device when a user is walking with the mobile device, in accordance with an embodiment of the present invention.

DETAILED DESCRIPTION

Embodiments of the present invention improve the ease with which a user may select a selectable object on a touch screen. Embodiments of the present invention determine when the mobile phone's user is walking with the mobile device. The interface is changed from a standard mode to a walk mode when the user is walking with the mobile device. The walk mode may have fewer features than the standard interface. The features included in the walk mode may be enlarged and displayed with increased spacing to increase the ease of selection. In one embodiment, the most frequently used features from the standard mode are included in the walk mode.

Throughout the description of embodiments of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the present invention.

| | |
|---|---|
| API | Application Interface |
| CDMA | Code Division Multiple Access |
| CD-ROM | Compact Disk Read Only Memory |
| DVD | Digital Versatile Discs |
| EEPROM | Electrically Erasable Programmable Read Only |

-continued

| | Memory |
|---|---|
| GSM | Global System for Mobile-Communications |
| LAN | Local Access Network |
| PDA | Personal Digital Assistant |
| PDSN | Packet Data Serving Node/Home Agent |
| RAM | Random Access Memory |
| ROM | Read Only Memory |
| SMS | Short Messaging Service |
| SMSC | Short Messaging Service Center |
| SIP | Session Initiation Protocol |
| TDMA | Time Division Multiple Access |

Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data presentations. Media examples include, but are not limited to, information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Figure 1:
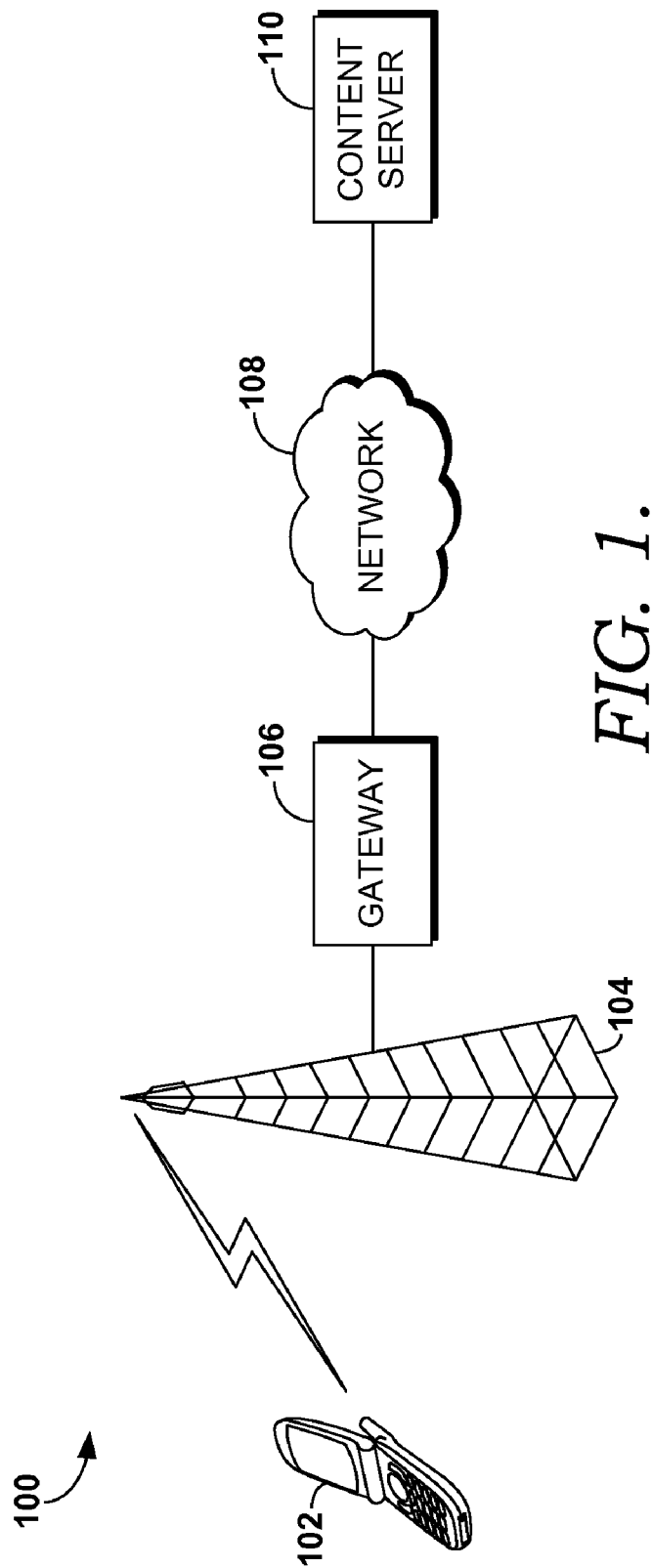
FIG. 1 is a drawing showing an illustrative operating environment suitable for use with an embodiment of the present invention.

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes a mobile device 102, a base station 104, a gateway 106, a network 108, and a content server 110. The components shown in FIG. 1 are a few components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and are not meant to be limiting.

Mobile device 102 is depicted as a wireless communications device that communicates over an air interface with base station 104. Mobile device 102 is a wireless terminal adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

The mobile device 102 may take on any of a variety of forms. By way of example, mobile device 102 may be a mobile telephone, smart phone, laptop computing device, desktop computing device, server, personal digital assistant ("PDA") or any combination of these or other devices. The mobile device 102 includes a touch screen for receiving input from a user. The touch screen may present a user interface with multiple selectable items that may be chosen by a user touching the screen with a finger or stylus. Mobile device 102 is capable of accessing content over the Internet. Examples of content that may be received include text messages, multimedia messages, emails, calendar updates, web pages, videos, pictures, and task reminders.

The mobile device 102 may be associated with a user. For example, a text message sent to mobile device 102 would be intended for the user. The user is the ultimate recipient of communications (e.g., emails, phone calls, text messages) and media content sent to mobile device 102.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Gateway 106 provides a boundary between radio communication functions embodied in one or more radio-access systems that form the access-facing portion of illustrative operating environment 100 and the standard internet protocol ("IP") communication functions (including Mobile IP) embodied in the public-network facing portion (e.g., network 112) of illustrative operating environment 100. Access gateway 106 might be, for example, an ASN-GW, a PDSN, and SGSN/GGSN, and the like. The gateway 106 includes a computing devi08 that may include a CPU, short-term memory, long-term memory, and one or more network interfaces. The network interfaces are used to communicate data between the network 108 and devices, such as mobile device 102, connected to the access-facing portion of illustrative operating environment 100. A network interface to the WAN or LAN could be wired, wireless, or both.

Network 108 may include one or more mobile networks, one or more packet-based networks, including the Internet, and the public-switched telephone network ("PSTN"). The various components within network 108 may be owned and/or operated by multiple entities, commercial or otherwise. Network 108 is configured to transmit a variety of communication formats including phone calls, emails, text messaging, faxes, instant messaging, pages, voice mails, photographs, audio files, web pages, videos, movies, TV shows, calendar reminders, task reminders, and other files containing communicative content.

The content server 110 stores media content and communicates it to a user upon receiving a request for the media. Examples of media content include web pages, videos, audio files, and games. The content server 110 includes a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, the content server 110 facilitates transmission of media content (e.g. movies, web pages, videos, MP3s, etc.) to mobile device 102. The content server 110 transmits the media content over the network 108. The content server 110 may also host web pages that are transmitted to a requesting device as an interface to access other content.

Figure 2:
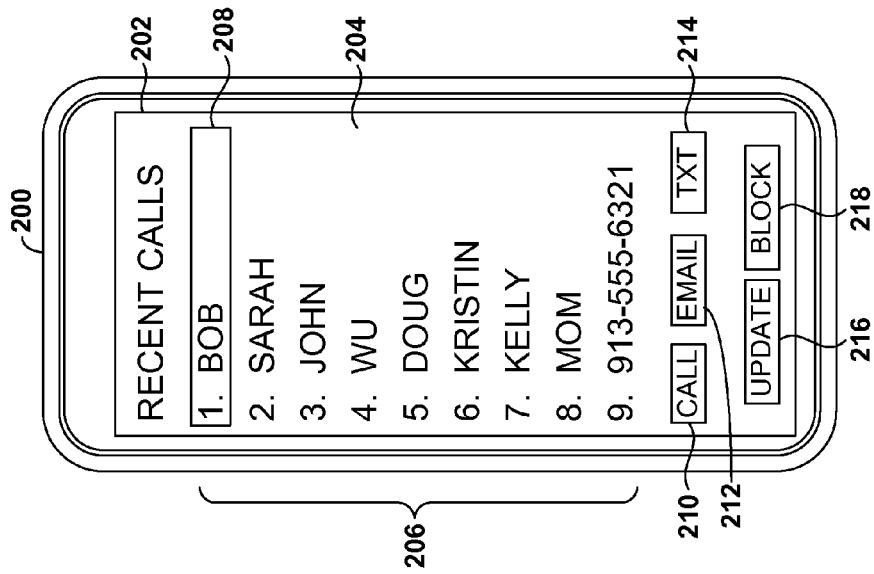
FIG. 2 is a diagram showing a user interface in standard mode, in accordance with an embodiment of the present invention.

Turning now FIG. 2, a user interface in standard mode is shown, in accordance with an embodiment of the present invention. The mobile device 200 may be similar to the mobile device 102 described previously with reference to FIG. 1. The mobile device 200 may be a PDA, smart phone, or other similar computing device. The mobile device 200 includes a touch screen 202. A touch screen 202 receives input through a physical object contacting the surface of the touch screen 202. Suitable physical objects include a human finger and a stylus.

Continuing with reference to FIG. 2, the standard user interface 204 shows the contacts 206 associated with recent calls. The standard user interface 204 is shown when the mobile device's user is not walking with the mobile device 200. Box 206 indicates that a first contact "Bob" has been selected by the user. In one embodiment, the user may select "Bob" by placing their finger or a stylus adjacent to where "Bob" is displayed. The standard user interface 204 includes several action buttons. The action buttons perform an action in response to their selection. The call button 210 will place a call to the selected contact, in this case Bob, when selected. The email button 212 will generate an email addressed to the selected contact. The text button 214 will initiate a text message addressed to the selected contact. The update button 216 will open an interface through which the selected contact's user information may be updated. The block button 218 will cause communications originating from the selected contact to be blocked. These are just five examples of action buttons that may be shown on a user interface associated with a mobile device. Embodiments of the present invention are not limited to use with these action buttons.

Figure 3:
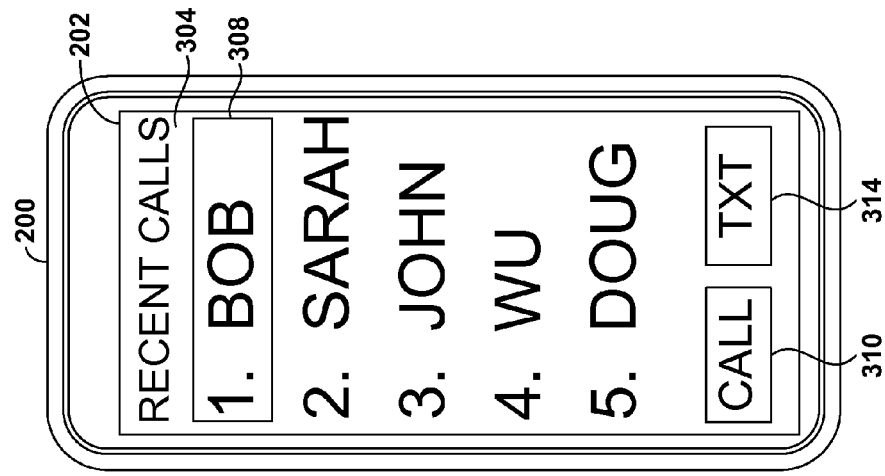
FIG. 3 is a diagram showing a user interface in walk mode, in accordance with an embodiment of the present invention.

Turning now to FIG. 3, a user interface in walk mode is shown, in accordance with an embodiment of the present invention. The walk-mode interface 304 is based on the standard mode interface 204 described previously with reference to FIG. 2. A mobile device may have several standard interfaces 204. The standard interface shown depends on the application, or portion of an application, that is running on the mobile device. Each standard interface may be associated with a corresponding walk-mode interface. The walk-mode interface 304 is shown when the mobile device 200 detects that the mobile device's user is walking with the mobile device 200. The walk-mode interface 304 again shows a box around "Bob" 308 indicating that contact "Bob" has been selected. In contrast to the standard mode 204 shown in FIG. 2, the walk mode 304 only shows four contacts, and they are enlarged. Thus, in one embodiment, the walk-mode interface 304 is generated by enlarging a portion of content from the standard mode. But, selecting content for the walk-mode interface 304 is not limited to just enlarging a portion of the standard interface 204.

Content for the walk-mode interface 304 may be included based on different criteria. As can be seen in FIG. 3, less content is shown in walk-mode interface 304 than in the standard interface 204. In one embodiment, the walk-mode interface 304 is generated by zooming in to a portion of the standard interface 204. Ideally, the portion of the standard interface most likely to be used by the user should be zoomed into. The portion most likely to be used by the user may be the portion most frequently used by the user, the portion most recently used by the user, or a portion that is selected by the user. In one embodiment, the user is allowed to select portions of the standard interface 204 to include in the walk-mode interface 304 through a configuration interface.

The configuration of the walk-mode interface 304 may occur at any time, including prior to determining the user is walking with the mobile device 200. The configuration interface may present standard interfaces for different applications and allow the user to select portions of the standard interface to include in the walk-mode interface 304 for a particular application. In one embodiment, the user may select a portion of the standard interface for inclusion in the walk-mode interface 304 by drawing a box around the selected portion using the touch screen.

In another embodiment, content is included in the walk-mode interface based on user preferences. For example, the user could choose to show four of the most recent calls or a percentage of calls, contacts, action buttons, or other items shown on the standard interface. Thus, the user could select action buttons they are most likely to want on the walk-mode interface. In one embodiment, the user may create different walk-mode profiles for different contacts selected. In other words, the user could choose to have three action buttons shown when a first contact, such as Bob, is selected and only two action buttons selected when a different user contact is selected. For example, with a first contact, the user may want the talk, call, and email buttons to be selected. In this case, the talk button would generate a walkie-talkie connection to the user. Other users may know that a contact does not have a phone that allows this functionality and, therefore, would not want this button displayed when that contact is selected.

Figure 4:
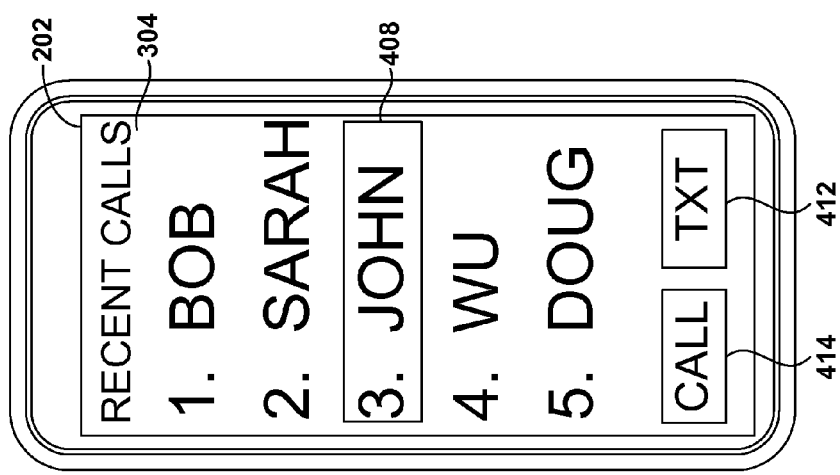
FIG. 4 is a diagram showing a user interface in walk mode that is based on a selected contact, in accordance with an embodiment of the present invention.

Continuing with reference to FIG. 3, the call button 310 and the text button 314 are displayed in the walk-mode interface 304. As indicated previously, the call button 310 and text button 314 may have been selected for inclusion in the walk-mode interface 304 because they are the most frequently used action buttons or the most recently used action buttons. Similarly, the action buttons could have been selected based on a user preference. The selection of the action buttons may be contact-specific. In other words, the action buttons shown when Bob is selected 308 may be different than when a different contact is selected. For example, in FIG. 4, when John is selected as indicated by box 408, the call button 414 and the text button 412 are shown. Thus, the action buttons and other features shown in the walk-mode interface may vary depending on the contact presently displayed or selected. While this example shows contacts from a recent call list, embodiments of the present invention may generate different walk-mode interfaces based on contacts in a contact list, missed calls list, an email list, a text message list, and other contexts.

Figure 5:
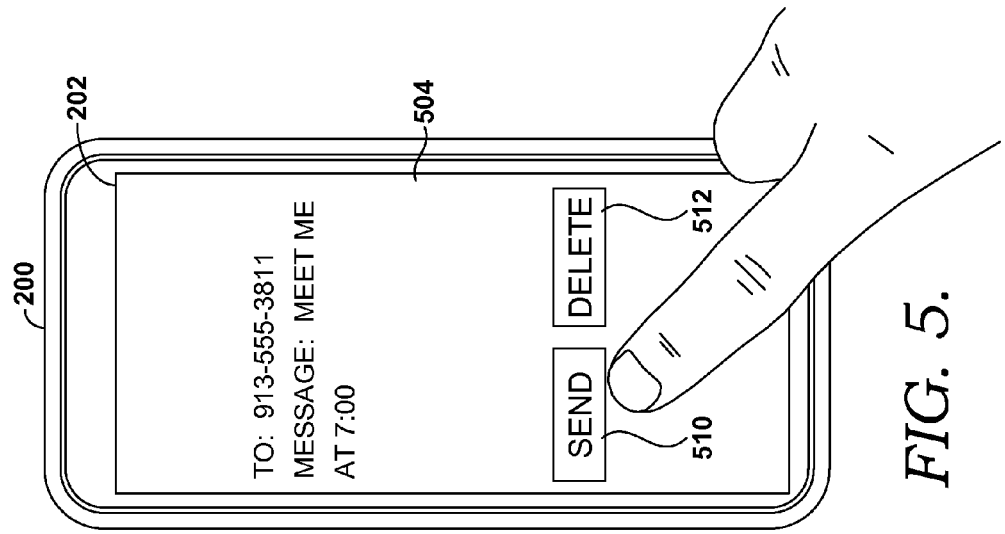
FIG. 5 is a diagram showing a texting interface, in accordance with an embodiment of the present invention.

Turning now to FIGS. 5, 6, and 7, a walk-mode interface that does not require a confirmation to take an action is shown, in accordance with an embodiment of the present invention. The standard texting interface 504 shows a text message and a user about to select the send 510 action button. A delete button 512 is also displayed on the standard texting interface 504. In standard mode, upon selecting the send 510 button a confirmation window 604 is opened, as shown in FIG. 6. To send the message, the user would then need to select the yes button 610 in the confirmation window 604. If a user chooses not to send the message, the user may push the no button 612 to return to the texting interface 504 shown in FIG. 5. Upon sending a message, a confirmation 706 may be displayed in a confirmation interface 704 as shown in FIG. 7. In one embodiment, when the phone is in walk mode, a confirmation window 604. In other words, in standard mode, the user would get the confirmation window 604 shown in FIG. 6 before the message is sent and a confirmation 706 is displayed. In walk mode, the message would be sent upon pressing the send button 510 and the message sent confirmation 706 would be displayed without first seeking confirmation through the confirmation window 604. FIGS. 5, 6, and 7 show a walk-mode interface that differs from a corresponding standard mode interface in that it eliminates the need to receive a confirmation from the user prior to taking an action. Confirmation messages may be eliminated by walk modes used in other contexts, and embodiments of the present invention are not limited to the text message example shown in FIGS. 5, 6, and 7.

Turning now to FIGS. 8 and 9, changing a standard interface into a walk-mode interface generated by zooming into a portion of the standard interface is shown, in accordance with an embodiment of the present invention. The standard mode interface 804 includes several action buttons. The action buttons include the call button 810, the email button 812, the contacts button 814, the text button 816, the tools button 818, the web browser button 820, the shop button 822, and the options button 824. Selecting each of these buttons may cause an action to be taken or other menu options to be presented to the user.

Turning now to FIG. 9, a walk-mode interface corresponding to the standard interface 804 is shown. The walk-mode interface 904 is the same as the standard interface 804 except that the walk-mode interface 904 is zoomed into the top portion of the standard interface 804 and rotated to make better use of the screen real estate. Thus, the walk-mode interface 904 is generated by zooming into and rotating the standard interface shown previously.

Turning now to FIG. 10, a method 1000 of enhancing selectability of objects displayed on a mobile device's touch screen is shown, in accordance with an embodiment of the present invention. The mobile device may be similar to mobile device 102 described previously with reference to FIG. 1. At step 1010, the mobile device is determined to be moving in a pattern that indicates the mobile device is being carried by a user who is presently walking. The pattern is detected using readings from accelerometers in the mobile device. The readings may indicate that the phone is moving within a threshold range of velocities indicative of a user walking with the mobile device. For example, the velocity range may be between one and six miles per hour. In addition to an overall velocity, the accelerators may detect an up and down motion having a period consistent with a person walking. In one embodiment, the user is not determined to be walking if the user's velocity is above a threshold velocity.

At step 1020, a walk-mode interface is displayed through the mobile device's touch screen. The walk-mode interface increases an ease with which objects may be selected through the touch screen as compared to a standard interface displayed when the user of the mobile device is not walking with the mobile device. The ease with which objects may be selected may be improved by showing fewer objects and by increasing the display size of the objects. The walk-mode interface may be generated by zooming into a portion of the standard interface. In another embodiment, the objects shown in the walk-mode interface are selected from different portions of the standard interface based on a likelihood that the user will select the objects. The likelihood of future selection may be determined based on the most recent selection and the frequency of selection. In another embodiment, the objects are selected based on a user's expressed preferences.

Turning now to FIG. 11, a method 1100 of improving usability of a mobile device when a user is walking with the mobile device is shown, in accordance with an embodiment of the present invention. At step 1110, the user is determined to be walking with the mobile device. As described previously, the user may be determined to be walking with the mobile device based on accelerometer readings in the mobile device. The movement of the mobile device within threshold ranges may indicate that the user is walking with the device.

At step 1120, a user interface on the mobile device is changed into a walk mode upon determining that the user is walking with the mobile device. In one embodiment, the walk mode displays less content than the standard mode. At step 1130, the user is determined to have stopped walking with the mobile device. At step 1140, upon determining that the user has stopped walking, the user interface in the mobile device is changed back to the standard mode.

Figure 12:
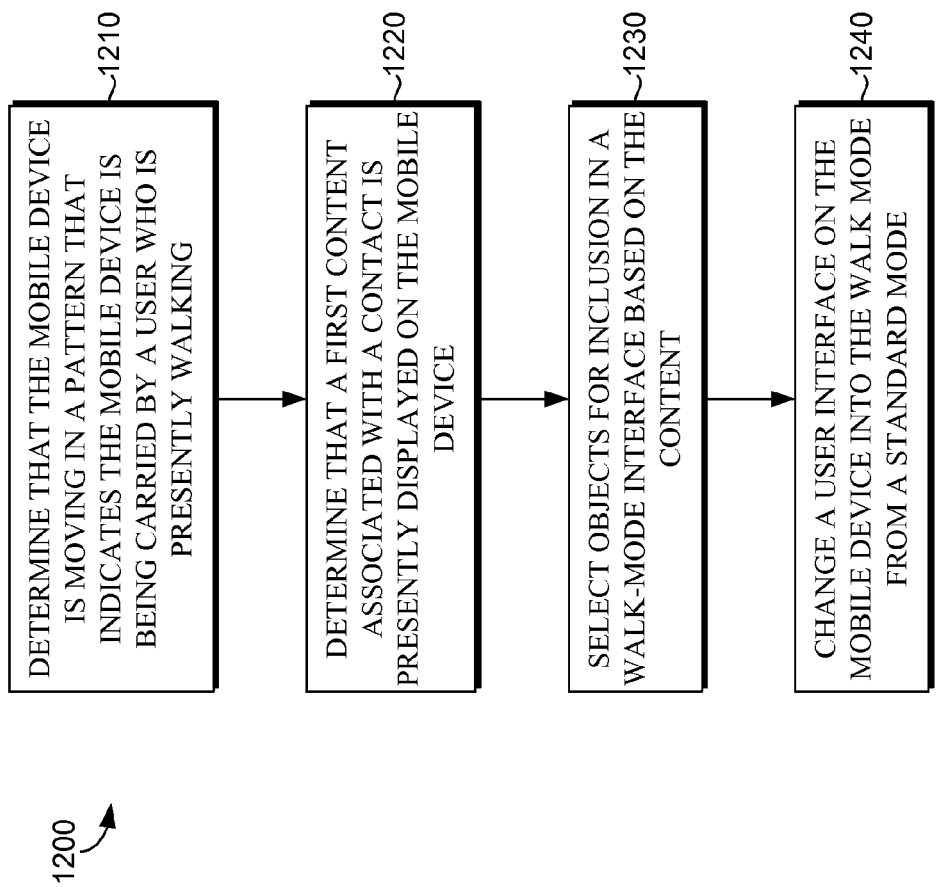
FIG. 12 is a flow chart showing a method of changing a display mode on the mobile device when a user of the mobile device is walking with the mobile device, in accordance with an embodiment of the present invention.

Turning now to FIG. 12, a method of changing a display mode on the mobile device when a user of the mobile device is walking with the mobile device is shown, in accordance with an embodiment of the present invention. At step 1210, the mobile device is determined to be moving in a pattern that indicates the mobile device is being carried by a user who is presently walking. As explained previously, the pattern may be detected using readings from accelerometers in the mobile device. At step 1220, a first content associated with a contact is determined to be presently displayed on the mobile device.

At step 1230, objects are selected for inclusion in a walk-mode interface based on the contact. Thus, the walk mode may be customized based on the contact shown on the interface.

At step 1240, a user interface on the mobile device is changed into the walk mode. As described previously, the walk mode shows a first content and the standard mode shows a second content. In one embodiment, the first content in the walk mode is a subset of the content shown in the standard mode. The first content may be selected based on frequency of use, user configuration, and the most recently used items. The content which may be associated with the contact includes one or more of a name in a recently received calls list, recently missed calls list, a contact file, or a contact associated with a text message, email, or other communication.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more non-transitory computer-readable media having one or more computer-executable instructions embodied thereon for performing a method of enhancing selectability of objects displayed on a mobile device's touch screen, the method comprising:

determining that the mobile device is moving in a pattern that indicates the mobile device is being carried by a user who is presently walking, wherein the pattern is detected using readings from accelerometers in the mobile device; and displaying, though the mobile device's touch screen, a walk-mode interface that increases an ease with which the objects are selected through the touch screen as compared to a standard interface displayed when the user of the mobile device is not walking with the mobile device, wherein the ease with which the objects are selected is increased by automatically zooming into an area of the standard interface that is most likely to be utilized by the user and by not requiring the user to input a confirmation in response to requesting an action that generates a confirmation request in the standard interface.

2. The media of claim 1, wherein said determining includes determining the mobile device is moving a threshold distance up and then the threshold distance down within a threshold period of time.

3. The media of claim 2, wherein said determining includes determining the mobile device is moving at a velocity less than six miles per hour.

4. The media of claim 1, wherein the method further includes determining the area of the standard interface that is most likely to be utilized by the user based on the user's previous interactions with the standard user interface.

5. The media of claim 1, wherein the walk-mode interface shows less action buttons than the standard interface, wherein action buttons are selected for display based on the user's previous usage of the action buttons.

6. The media of claim 5, wherein the user's previous usage of the action buttons is evaluated as specific to a contact presently shown on the updated user interface.

7. One or more non-transitory computer-readable media having one or more computer-executable instructions embodied thereon for performing a method of improving usability of a mobile device when a user is walking with the mobile device, the method comprising:
  determining that a user is walking with the mobile device;
  changing a user interface on the mobile device into a walk-mode from a standard mode, wherein the walk mode shows a first content and the standard mode shows a second content, wherein the walk mode displays less content than the standard mode;
  eliminating a need for the user to provide confirmation input when the mobile device is in walk mode in response to requesting an action that generates a confirmation request in the standard mode;
  determining that the user has stopped walking with the mobile device; and
  changing the user interface on the mobile device back to the standard mode.

8. The media of claim 7, wherein the user is determined to be walking with the mobile device when accelerometers in the mobile device detect a movement pattern consistent with indicating the user is walking with the mobile device.

9. The media of claim 7, wherein the content includes one or more of input buttons, messages, icons, menu items, and message content.

10. The media of claim 7, wherein the first content includes a subset of the second content and wherein the first content is selected based on frequency of use.

11. The media of claim 7, wherein the first content includes a subset of the second content and wherein the first content is based on user preferences.

12. The media of claim 7, wherein the first content includes a subset of the second content and is generated by zooming into a portion of the second content.

13. A method of changing a display mode on a mobile device when a user of the mobile device is walking with the mobile device, the method comprising:
  determining that the mobile device is moving in a pattern that indicates the mobile device is being carried by a user who is presently walking, wherein the pattern is detected using readings from accelerometers in the mobile device;
  changing a user interface on the mobile device into the walk mode from a standard mode, wherein the walk mode shows a first content and the standard mode shows a second content, wherein the walk mode displays less content than the standard mode; and
  generating the first content by selecting objects from the second content that are most likely to be utilized by the user based on the user's previous interactions with the objects in standard mode.

14. The method of claim 13, wherein the first content includes one or more of input buttons, messages, icons, menu items, and message content.

15. The method of claim 13, wherein the first content includes a subset of the second content and wherein the first content is selected based on frequency of use.

16. The method of claim 13, wherein the content associated with the contact is a text message.

17. The method of claim 13, wherein the content associated with the contact is an entry in a contact list that is associated with the contact.

* * * * *